US009516666B2

(12) United States Patent
Xue

(10) Patent No.: US 9,516,666 B2
(45) Date of Patent: Dec. 6, 2016

(54) METHOD AND APPARATUS FOR CONTROLLING PPC RULE IN PRELOAD MODE

(71) Applicant: DATANG MOBILE COMMUNICATIONS EQUIPMENT CO., LTD, Beijing (CN)

(72) Inventor: Qian Xue, Beijing (CN)

(73) Assignee: Datang Mobile Communications Equipment Co., Ltd, Beijing (CN)

( * ) Notice: Subject to any disclaimer, the term of this patent is extended or adjusted under 35 U.S.C. 154(b) by 0 days.

(21) Appl. No.: 14/443,064

(22) PCT Filed: Aug. 1, 2013

(86) PCT No.: PCT/CN2013/080657
§ 371 (c)(1),
(2) Date: May 14, 2015

(87) PCT Pub. No.: WO2014/075465
PCT Pub. Date: May 22, 2014

(65) Prior Publication Data
US 2015/0296531 A1 Oct. 15, 2015

(30) Foreign Application Priority Data

Nov. 15, 2012 (CN) .......................... 2012 1 0461072

(51) Int. Cl.
*H04W 72/12* (2009.01)
*H04L 12/947* (2013.01)
*H04L 12/24* (2006.01)

(52) U.S. Cl.
CPC ...... *H04W 72/1257* (2013.01); *H04L 41/0893* (2013.01); *H04L 41/5019* (2013.01); *H04L 49/25* (2013.01)

(58) Field of Classification Search
CPC .. H04L 41/5019; H04L 41/0893; H04L 49/25; H04W 72/1257; H04W 4/24
See application file for complete search history.

(56) References Cited

U.S. PATENT DOCUMENTS

2009/0305684 A1* 12/2009 Jones ...................... H04L 63/20
455/418
2012/0257199 A1* 10/2012 Liu ........................ G01N 21/658
356/301
(Continued)

FOREIGN PATENT DOCUMENTS

| CN | 101355438 A | 1/2009 |
|---|---|---|
| CN | 101459906 A | 6/2009 |
| CN | 103002426 A | 3/2013 |

OTHER PUBLICATIONS

PCT International Search Report for PCT Counterpart Application No. PCT/CN2013/080657, 7 pgs. (including English translation), (Oct. 31, 2013).

(Continued)

*Primary Examiner* — Brian D Nguyen
(74) *Attorney, Agent, or Firm* — Blakely, Sokoloff, Taylor & Zafman LLP

(57) ABSTRACT

Disclosed are a method and an apparatus for controlling a PPC rule in a Preload mode. The method comprises: in a Preload mode, a Policy and Charging Rule Function (PCRF) entity recording system time each time a PCC rule is delivered, and obtaining a Preload mode update time interval; at an interval of one clock period, the PCRF entity checking whether a service currently in a stable session state has a preset execution data, and if the service does not have a preset execution date, detecting an interval between the current time and a time when the previous PPC rule corresponding the service is delivered; when the interval between the current time and the time when the previous PPC rule (Continued)

corresponding to the service is delivered is one Preload mode update time interval, the PCRF entity updating an effective time and an expiration time of the PCC rule corresponding to the service that has been detected to have no preset execution date, so as to solve the problem that the PCC rule cannot be used repeatedly in the prior art.

18 Claims, 5 Drawing Sheets

(56) References Cited

U.S. PATENT DOCUMENTS

| | | | |
|---|---|---|---|
| 2013/0036032 A1* | 2/2013 | Cai | H04M 15/46 705/30 |
| 2013/0036215 A1* | 2/2013 | Kupinsky | H04L 41/0893 709/223 |
| 2013/0054428 A1* | 2/2013 | Shaikh | G06Q 30/04 705/30 |
| 2013/0097305 A1* | 4/2013 | Albal | H04W 76/00 709/224 |
| 2013/0326034 A1* | 12/2013 | Shaik | H04L 12/243 709/223 |
| 2014/0018063 A1* | 1/2014 | Mattsson | H04W 12/06 455/423 |

OTHER PUBLICATIONS

PCT Written Opinion of the International Searching Authority for PCT Counterpart Application No. PCT/CN2013/080657, 10 pgs. (including English translation), (Oct. 31, 2013).

PCT Notification Concerning Transmittal of International Preliminary Report on Patentability (Chapter I of the Patent Cooperation Treaty) for PCT Counterpart Application No. PCT/CN2013/080657, 14 pp. (including English translation), (May 28, 2015).

* cited by examiner

METHOD AND APPARATUS FOR CONTROLLING PPC RULE IN PRELOAD MODE

CROSS-REFERENCE TO RELATED APPLICATIONS

This patent application is a U.S. National Stage Application under 35 U.S.C. §371 of International Application No. PCT/CN2013/080657, filed on Aug. 1, 2013, entitled METHOD AND APPARATUS FOR CONTROLLING PPC RULE IN PRELOAD MODE, designating the United States, and claiming the benefit of Chinese Patent Application No. 201210461072.7, filed with the Chinese Patent Office on Nov. 15, 2012, and entitled "Method and device for controlling a PCC rule in a preload mode", which was incorporated by reference in its entirety.

FIELD

The present invention relates to the field of mobile communications and particularly to a method and device for controlling a PCC rule in a preload mode.

BACKGROUND

In the Policy Control and Charging (PCC) architecture of the 3$^{rd}$ Generation Partnership Project (3GPP), a network element of a core network, which is a Packet Gateway (PGW) interacts with a Policy and Charging Rule Function (PCRF) entity via a Gx interface to create an Internet Protocol (IP)-Connectivity Access Network (CAN) session and to perform policy control. FIG. 1 illustrates a flow of creating an IP-CAN session. The PGW transmits a Credit-Control-Request (CCR) message to the PCRF entity to request for creation of an IP-CAN session, and the PCRF entity feeds a Credit-Control-Answer (CCA) message back to the PGW to acknowledge creation of the IP-CAN session.

During the session is being maintained, the PCRF entity can transmit a Re Auth Request (RAR) message to the PGW to request for reauthorization of PCC rules or for update of a list of report events, and the PGW responds to the RAR message by feeding back a Re Auth Answer (RAA) message to the PCRF entity, as illustrated in FIG. 2.

A pre-load mode refers to that the PCRF entity transmits respective PCC rules (including validation time and invalidation time of each rule), for PCC control on a related service for different periods of time, to the PGW at a time. The PGW itself controls the PCC rules to be enforced for the current time. The PCC rules can be issued and enforced in the preload mode to thereby decrease signaling interaction between the PCRF entity and the PGW and improve the processing efficiency, which is applied to a scenario where respective PCC rules for busy and idle time are enforced. As illustrated in FIG. 3, in the preload mode, the PGW transmits a Credit-Control-Request-Initial (CCR-I) message to the PCRF entity to request for creation of a session, the PCRF entity feeds a CCA-I message (including validation time and invalidation time of PCC rule) back to the PGW, and the PGW starts enforcement of a corresponding PCC rule at the validation time of the PCC rule in a Credit-Control-Answer-Initial (CCA-I) message and terminates the PCC rule at the invalidation time of the PCC rule.

In the preload mode, the validation time and the invalidation time of the PCC rule issued by the PCRF entity have to specify corresponding particular date and time (i.e., particulate year/month/day/hour/minute/second), for example, validation time of some PCC rule is 8:00:00 on Dec. 12, 2012, and invalidation time thereof is 16:00:00 on Dec. 12, 2012. Since each of the PCC rules, provided by the PCRF entity, to be enforced by a Policy and Charging Enforcement Function (PCEF), can only be enforced for policy control on the corresponding service for some period of time on a particular preset date in the preload mode, the PCC rule will be invalidated once the particular preset date elapses. Thus this approach to issue the PCC rule can not be applicable if time universality is required.

For example, some PCC rule needs to be enforced from 8:00:00 to 16:00:00 every day in the preload mode, so a particular year/month/day (i.e., a particular date) on which the service is enforced may not be specified as long as a hour/minute/second at which the service is started and a hour/minute/second at which the service is terminated (i.e., a particular period of time) are specified.

In the prior art, although the control on the PCC rule is transferred to the PGW in the preload mode, and the PCRF entity only needs to initially configure the PGW with the related PCC rule information. However, it is specified in the protocol that the validation time and the invalidation time of the PCC rule must be in correspondence to some particular year/month/day/hour/minute/second, and the PGW can not perform PCC control on the corresponding service after the validation date corresponding to the PCC rule elapses. If it needs to perform PCC control again on the corresponding service, then the PGW has to transmit a CCR message again to request for issuance of the PCC rule. Thus the enforcement time preset for the PCC rule can take effect only once instead of being applied repeatedly in the preload mode in the prior art, thus increasing the consumption and overhead of signaling and also the consumption of system resources to thereby greatly degrade the value of applying and popularizing the preload mode.

SUMMARY

Embodiments of the invention provide a method and device for controlling a PCC rule in a preload mode so as to address the problem in the prior art of the impossibility to apply repeatedly a preset enforcement time of a PCC rule.

Particular technical solutions according to the embodiments of the invention are as follows:

An embodiment of the invention provides a method for controlling a PCC rule in a preload mode includes:

recording, by a PCRF entity, system time each time a PCC rule is issued, and obtaining an update time interval of the preload mode, in the preload mode;

detecting, by the PCRF entity, a time interval between current time and the recorded system time when a PCC rule corresponding to a service currently in a steady session state is lastly issued, upon detecting no enforcement date preset for the service; and updating, by the PCRF entity, validation time and invalidation time of the PCC rule corresponding to the detected service, for which no enforcement date is preset, when the time interval between the current time and the recorded system time when the PCC rule is lastly issued is the obtained update time interval of the preload mode.

An embodiment of the invention provides a device for controlling a PCC rule in a preload mode includes:

a time module configured to record system time each time a PCC rule is issued, and to obtain an update time interval of the preload mode, in the preload mode;

a detecting module configured to detect a time interval between current time and the recorded system time when a PCC rule corresponding to a service currently in a steady session state is lastly issued, upon detecting no enforcement date preset for the service; and an updating module configured to update validation time and invalidation time of the PCC rule corresponding to the detected service, for which no enforcement date is preset, when the time interval between the current time and the system time when the PCC rule is lastly issued is the obtained update time interval of the preload mode.

An embodiment of the invention provides a policy and charging rule function entity device including a processor and a data transceiver interface, wherein:

the processor is configured to record system time each time a PCC rule is issued to a PGW, and to obtain an update time interval of the preload mode, in the preload mode; to detect a time interval between current time and the recorded system time when a PCC rule corresponding to a service currently in a steady session state is lastly issued, upon detecting no enforcement date preset for the service; and to update validation time and invalidation time of the PCC rule corresponding to the detected service, for which no enforcement date is preset, when the time interval between the current time and the recorded system time when the PCC rule is lastly issued is the obtained update time interval of the preload mode; and the data transceiving interface is configured to communicate data between the processor and the PGW.

In the embodiments of the invention, the PCRF detects a service for which no enforcement date is preset, and updates validation time and invalidation time of a PCC rule corresponding to the service, for which no enforcement date is preset, to the PGW at each update time interval of the preload mode, so that the PCC rule can be enforced repeatedly so as to address the problem in the prior art of the impossibility to apply repeatedly a preset enforcement time of a PCC rule and consequentially the impossibility to satisfy time universality, which may result in an increased signaling overhead and increased consumption of system resources.

DETAILED DESCRIPTION OF THE EMBODIMENTS

With a method according to an embodiment of the invention, in a preload mode, a PCRF entity detects periodically an update time point of a PCC rule corresponding to a service for which no enforcement date is preset, and if the update time point of the PCC rule corresponding to the service, for which no enforcement date is preset, arrives, then the PCRF entity updates validation time and invalidation time of the PCC rule, so that the PCC rule corresponding to the service, for which no enforcement date is preset, can be applied repeatedly to thereby meet required universality in time and save a signaling overhead and consumed resources.

In the embodiments of the invention, the service for which no enforcement date is preset particularly refers to that a year/month/day on which the service is enforced (i.e., an enforcement date) is not particularly required, but a hour/minute/second at which the service is started and a hour/minute/second at which the service is terminated (i.e., a particular period of time) are specified.

Preferred embodiments of the invention will be described below with reference to the drawings.

Figure 1:
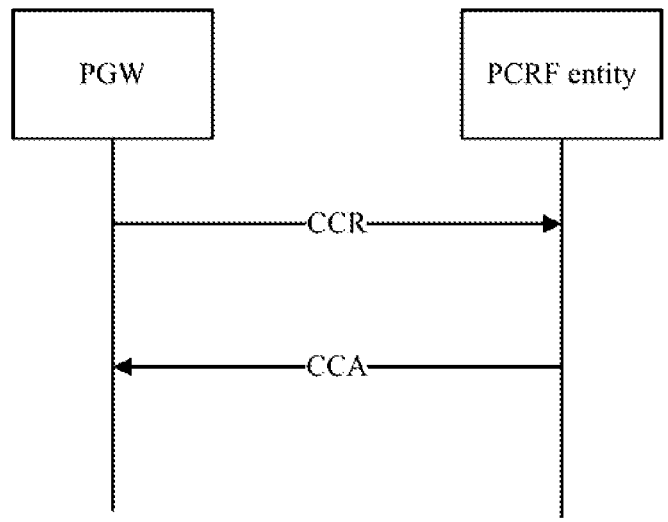
FIG. 1 illustrates a flow chart of creating an IP-CAN session in the prior art.
Figure 2:
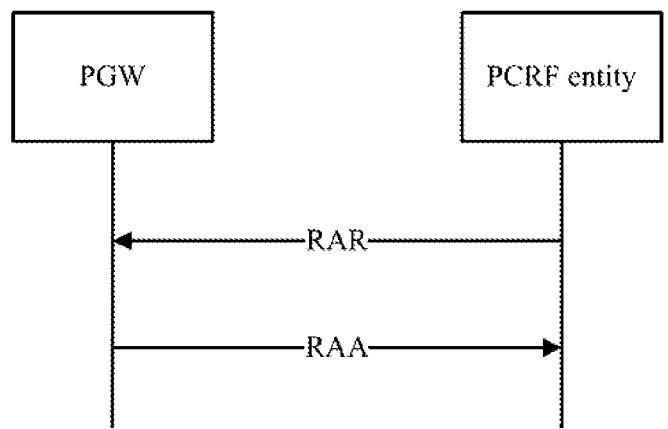
FIG. 2 illustrates a flow chart of modifying an IP-CAN session as triggered actively by a PCRF in the prior art.
Figure 3:
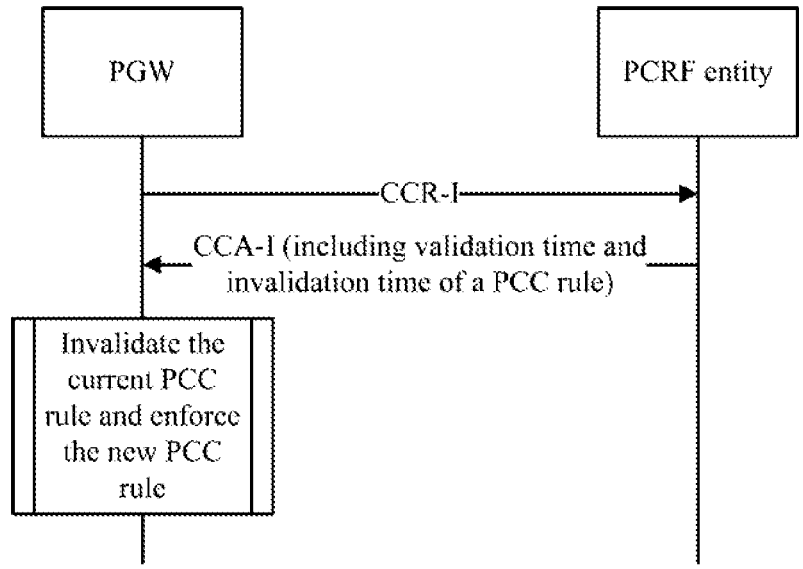
FIG. 3 illustrates a flow chart of a process in the preload mode in the prior art.
Figure 4:
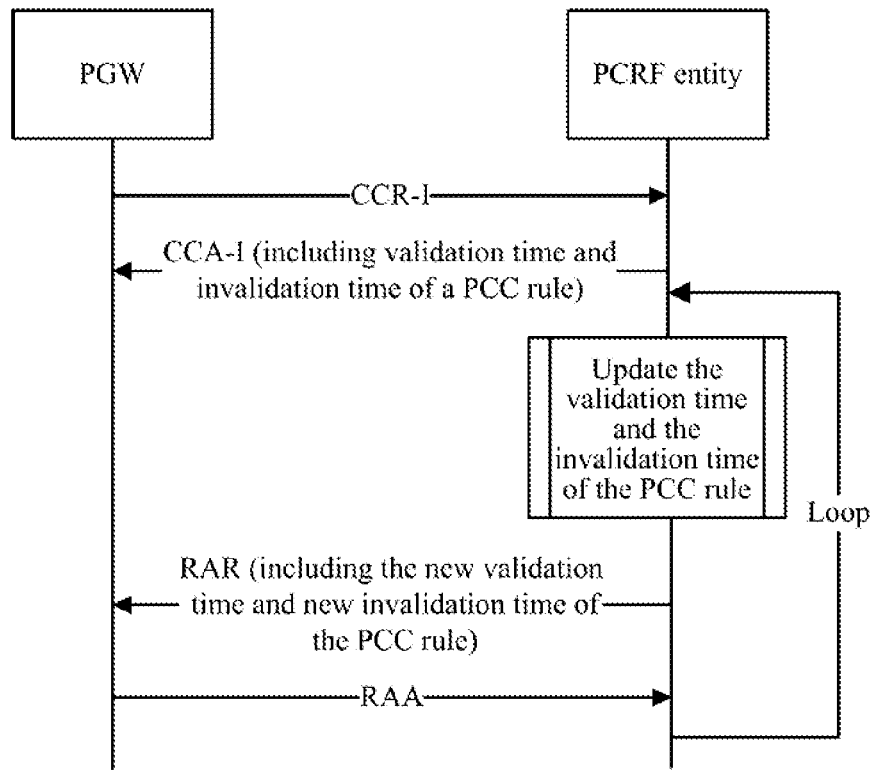
FIG. 4 illustrates a flow chart of a process in a preload mode optimized according to an embodiment of the invention.

A process of controlling a PCC rule in a method according to an embodiment of the invention in a preload mode will be described below with reference to FIG. 4.

In the embodiment of the invention, a PGW transmits a CCR-I message to a PCRF entity to request for creation of an IP-CAN session, and the PCRF entity feeds back a CCA-I message including validation time and invalidation time of a PCC rule to acknowledge creation of the IP-CAN session with the PGW. The PCRF entity updates periodically the validation time and the invalidation time of the PCC rule according to an update time interval of the PCC rule. When an update time point of the PCC rule arrives, the PCRF entity transmits an RAR message including new validation time and new invalidation time of the PCC rule to the PGW to reauthorize the PCC rule.

The PGW feeds a corresponding RAA message back to the PCRF entity upon reception of the RAR message, and performs PCC control on the corresponding service according to content of the PCC rule, the new validation time and new invalidation time in the RAR message.

The PCRF entity detects whether an RAA message fed back by the PGW is received in a preset period of time, and if so, then the PCRF entity can continue with update periodically the validation time and the invalidation time of the PCC rule; otherwise, the PCRF entity clears corresponding stored information about the PCC rule.

Figure 5:
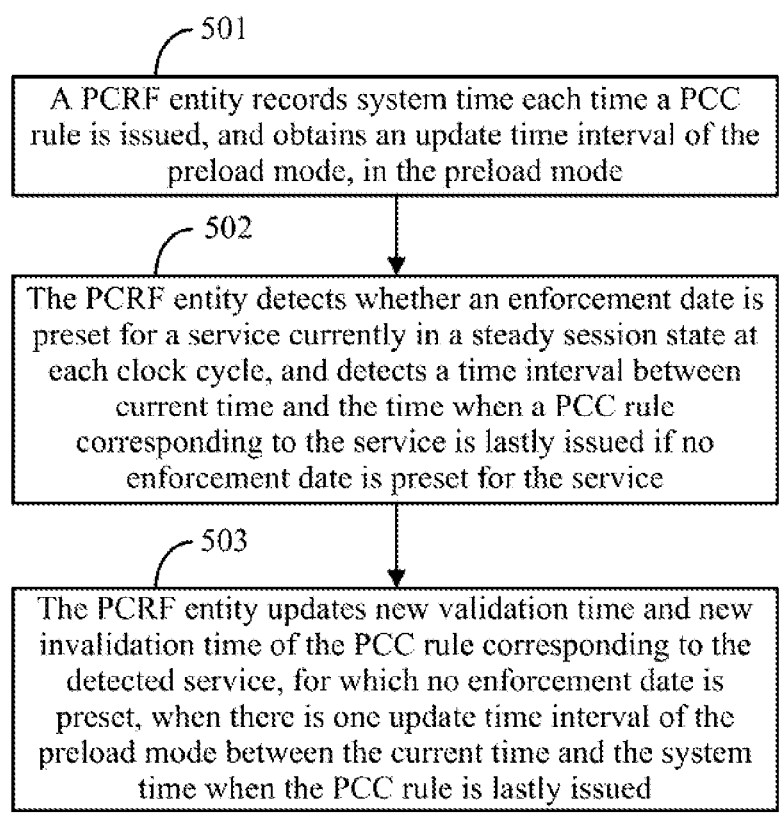
FIG. 5 illustrates a flow chart of a method for controlling a PCC rule in a preload mode according to an embodiment of the invention.

FIG. 5 illustrates a flow chart of a method for controlling a PCC rule in a preload mode according to an embodiment of the invention.

Operation 501, a PCRF entity records system time each time a PCC rule is issued, and obtains an update time interval of the preload mode, in the preload mode.

In a real application, the PCRF entity records a current Greenwich Mean Time (GMT) in service information of a session of the PCRF entity and a PGW, each time its corresponding PCC rule is issued, in the preload mode. A period of time between each time and a next time when the same PCC rule is issued is referred to as the update time interval of the preload mode.

Operation 502, the PCRF entity detects a time interval between current time and the time when a PCC rule corresponding to a service currently in a steady session state is lastly issued, upon detecting no enforcement date preset for the service.

In a real application, a periodical detection timer (with a periodicity, the length T of which can be adjustably configured) can be set in the PCRF entity. The periodical detection timer starts counting each time a corresponding PCC rule is issued. Each time the timer expires, the PCRF entity detects whether an enforcement date is preset for each activated service in a steady session state. The service in a steady session state refers to a service with a corresponding IP-CAN session which is in steady state.

Alternatively the PCRF entity can detect non-periodically whether an enforcement date is preset for the service currently in a steady session state. For example, the PCRF entity detects whether an enforcement date is preset for the service currently in a steady session state, one minute after the PCC rule is issued, and detects whether an enforcement date is preset for the service currently in a steady session state, every 30 seconds in the next 20 minutes.

For any activated service in a steady session state, if its time trigger mode is the preload mode and an enforcement time of the service stored by the PCRF entity is independent of a year/month/day, then the GMT time recorded in service information of an session instance is subtracted from the current GMT time to obtain a time interval between the time when a PCC rule corresponding to the service is lastly issued and the current GMT time, which is set as Tdelay.

In a real application, if there are a plurality of services involved in a steady session, then these services can be detected and handled concurrently, that is, the PCRF entity detects concurrently whether a respective time trigger mode is the preload mode for each service involved in the same steady session and whether an enforcement date is preset for the service.

Operation 503, the PCRF entity updates new validation time and new invalidation time of the PCC rule corresponding to the detected service, for which no enforcement date is preset, when there is one update time interval of the preload mode between the current time and the system time when the PCC rule is lastly issued.

In a real application, the validation time and the invalidation time of the PCC rule can be updated as follows.

The PCRF entity can calculate next validation time and next invalidation time of the PCC rule from last validation time and last invalidation time of the PCC rule, and a preset enforcement time interval of the service stored in the PCRF entity, wherein a preset enforcement time interval of any service is equal to the difference between two validation times of a PCC rule corresponding to the any service. In a real application, the preset enforcement time interval of the PCC rule is very likely to be the same as the update time interval of the preload mode, or the preset enforcement time interval of the PCC rule may possibly be different from the update time interval of the preload mode.

The PCRF entity can transmit the generated new validation time and new invalidation time of the PCC rule corresponding to the detected service, for which no enforcement date is preset, together with the corresponding PCC rule to the PGW in an RAR message, after updating the validation time and the invalidation time of the PCC rule corresponding to the detected service for which no enforcement date is preset, as follows without any limitation thereto.

If Tdelay is less than the specified update time interval of the preload mode (the Interval with a periodicity, the length of which can be adjustably configurable), then the value of an update flag, UpdFlag, of a PCC rule corresponding to each detected service for which no enforcement date is preset, is set to 1.

Since PCC rules corresponding to the respective services involved in the same steady IP-CAN session are issued in the same CCA-I message, update time intervals of the preload mode corresponding to these rules can be determined the same.

If Tdelay is equal to the specified update time interval of the preload mode (the Interval with a periodicity, the length of which can be adjustably configurable), then it can be determined that the respective services involved in the same steady IP-CAN session have been traversed, and at this time, an RAR message is generated for a service with UpdFlag being 1, the RAR message carries a PCC rule issued for the service with UpdFlag being 1, and new validation time and invalidation time of the PCC rule.

The PGW stores corresponding information about the PCC rule carried in the RAR message, and returns an RAA message to the PCRF entity, upon reception of the RAR message. If the RAA message fails to be returned (that is, no RAA message returned by the PCRF entity has been received in a preset period of time after the PCRF entity transmits the RAR message), then the PCRF entity clears the previously stored corresponding information about the PCC rule.

Figure 6:
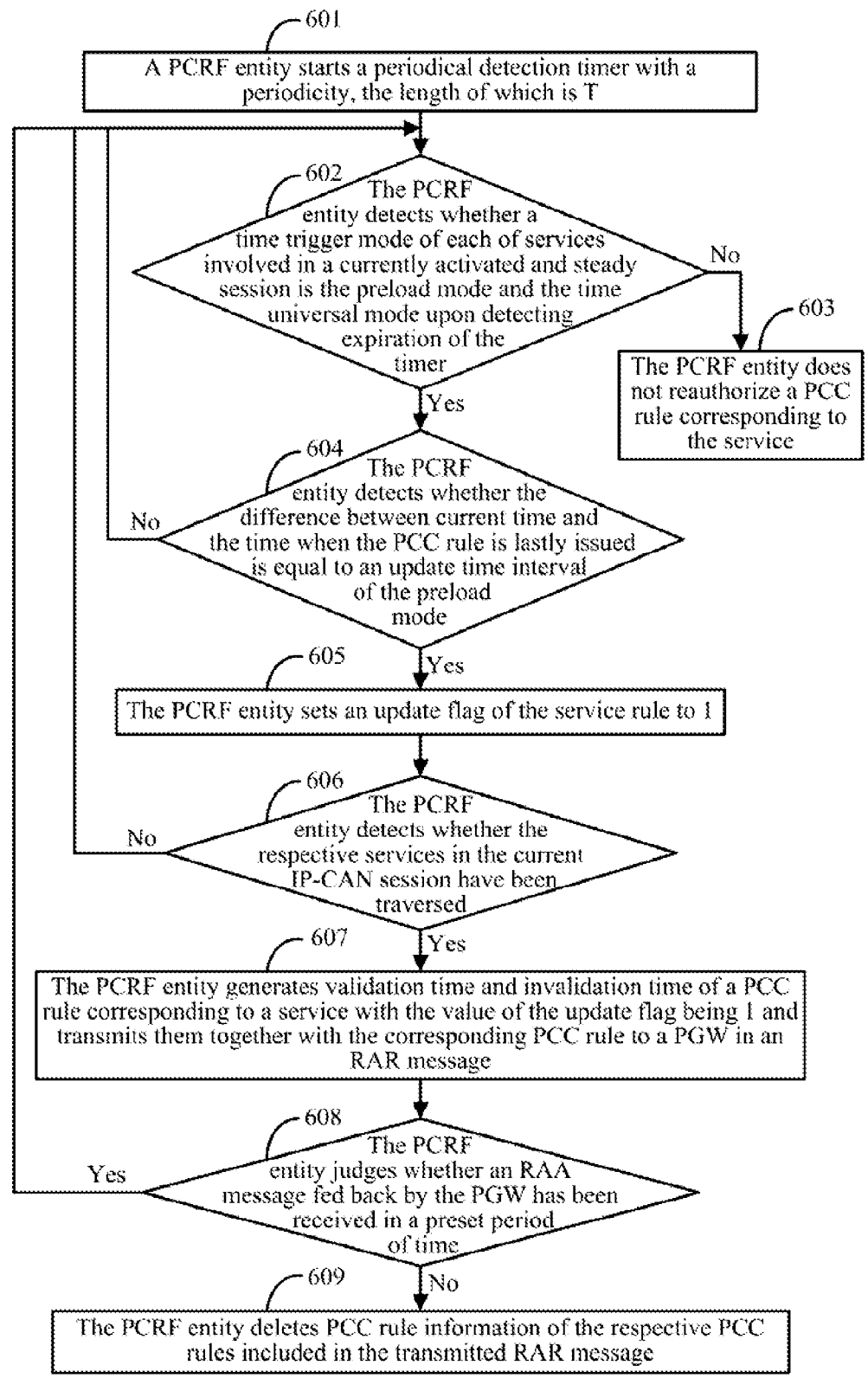
FIG. 6 illustrates a flow chart of an implementation process of a method for controlling a PCC rule in a preload mode according to an embodiment of the invention.

An implementation process of a method for controlling a PCC rule in a preload mode according to an embodiment of the invention will be described below with reference to FIG. 6, and in this process, preset enforcement time intervals of PCC rules of respective services involved in a current steady session are the same as an update time interval of the preload mode:

Operation 601, a PCRF entity starts a periodical detection timer with a periodicity, the length of which is T.

Operation 602, the PCRF entity detects whether a time trigger mode of each of services involved in a currently activated and steady session is the preload mode and the time universal mode (that is, the service is enforced periodically and repeatedly, the enforcement time being independent of a year/month/day) upon detecting expiration of the timer (that is, each time a clock cycle T expires), and if so, then the process proceeds to the operation 604; otherwise, the process proceeds to the operation 603.

In a real application, if there a plurality of services involved in the currently activated and steady session, then the respective services can be detected concurrently.

Operation 603, the PCRF entity does not reauthorize a PCC rule corresponding to the service.

Operation 604, the PCRF entity detects whether the difference between current time and a time when the PCC rule is lastly issued is equal to an update time interval of the preload mode, and if so, then the process proceeds to the operation 605; otherwise, the process returns to the operation 602.

Operation 605, the PCRF entity sets an update flag of the rule of the service to 1.

Operation 606, the PCRF entity detects whether the respective services in the current IP-CAN session have been traversed, and if so, then the process proceeds to the operation 607; otherwise, the process returns to the operation 602.

Operation 607, the PCRF entity generates validation time and invalidation time of a PCC rule corresponding to a service with the value of the update flag being 1 and transmits them together with the corresponding PCC rule to a PGW in an RAR message.

At this time there may be one or more services with the value of the update flag being 1. If there are a plurality of services with the value of the update flag being 1, then the PCRF entity generates validation time and invalidation time of a PCC rule corresponding to each service with the value of the update flag being 1 and transmits them together with the corresponding PCC rule as it is to the PGW in an RAR message.

Operation 608, the PCRF entity judges whether an RAA message fed back by the PGW has been received in a preset period of time, and if so, then the process returns to the operation 602; otherwise, the process proceeds to the operation 609.

Operation 609, the PCRF entity deletes PCC rule information of the respective PCC rules included in the transmitted RAR message.

Another implementation process of a method for controlling a PCC rule in a preload mode according to the invention in connection with two embodiments thereof.

First Embodiment

In a real application, the PCRF entity starts a periodical detection timer with a periodicity, the length of which is one minute. The PCRF entity checks respective services involved in a currently activated and steady session once every minute. The PCRF entity detects the services involved in the currently activated and steady session as a service A and a service B one minute after the timer is started. If the PCRF entity detects that time trigger modes of both the service A and the service B are the preload mode, and preset enforcement time of both the service A and the service B stored in the PCRF entity are independent of a year/month/day, and the PGW performs PCC control on the service A between 01:00:00 and 02:00:00 every day under a corresponding PCC rule and performs PCC control on the service B between 01:30:00 and 02:30:00 every day under a corresponding PCC rule, thus the PCRF entity can obtain preset enforcement time intervals of both the service A and the service B as 24 hours.

If the update time interval, Interval, of the preload mode is also 24 hours, then the PCRF entity transmits the PCC rules corresponding to the service A and the service B, and first validation time and invalidation time corresponding to the respective PCC rules (the first validation time of the PCC rule corresponding to the service A is 01:00:00 on Dec. 12, 2012, and the first invalidation time thereof is 02:00:00 on Dec. 12, 2012; and the first validation time of the PCC rule corresponding to the service B is 01:30:00 on Dec. 12, 2012, and the first invalidation time thereof is 02:30:00 on Dec. 12, 2012) in the same CCA-I message at 00:30:00 on Dec. 12, 2012.

The PCRF entity generates second validation time and invalidation time of the PCC rule corresponding to the service A and second validation time and invalidation time of the PCC rule corresponding to the service B (the second validation time of the PCC rule corresponding to the service A is 01:00:00 on Dec. 13, 2012, and the second invalidation time thereof is 02:00:00 on Dec. 13, 2012; and the second validation time of the PCC rule corresponding to the service B is 01:30:00 on Dec. 13, 2012, and the second invalidation time thereof is 02:30:00 on Dec. 13, 2012) at 00:30:00 on Dec. 13, 2012 after one time interval, i.e., 24 hours, elapses.

The PCRF entity encapsulates the PCC rule corresponding to the service A and the PCC rule corresponding to the service B, and their respective second validation time and invalidation time into an RAR message for the service A and the service B, the contents, of the PCC rules corresponding to the service A and the service B, carried in the RAR message are not changed.

Second Embodiment

A PCRF entity detects whether there is currently a service involved in an activated and steady session. If the PCRF entity detects a service involved in a currently activated and steady session as a service C, and if the PCRF entity detects that a time trigger mode of the service C is also the preload mode, and a preset enforcement time of the service C stored in the PCRF entity is independent of a year/month/day (assumed that a PGW performs PCC control on the service C between 23:00:00 every day and 02:01:01 a next day under a corresponding PCC rule), then the PCRF entity can obtain a preset enforcement time interval of the service C as 24 hours and can set an update flag, UpdFlag, of the PCC rule corresponding to the service C to 1.

If an update time interval of the preload mode is also 24 hours, then the PCFR entity transmits the PCC rule corresponding to the service C, and first validation time and invalidation time corresponding thereto (the first validation time of the PCC rule corresponding to the service C is 23:00:00 on Dec. 18, 2012, and the first invalidation time thereof is 02:01:01 on Dec. 19, 2012) in the same CCA-I message at 22:01:01 on Dec. 18, 2012.

The PCRF entity generates second validation time and invalidation time of the PCC rule corresponding to the service C (the second validation time of the PCC rule corresponding to the service C is 23:00:00 on Dec. 19, 2012, and the second invalidation time thereof is 02:01:01 on Dec. 20, 2012) at 22:01:01 on Dec. 19, 2012 after 24 hours elapses, and the PCRF entity encapsulates the PCC rule corresponding to the service C, and the second validation time and invalidation time of the PCC rule into an RAR message for the service C. The content of the PCC rule corresponding to the service C carried in this RAR message is unchanged, and the RAR message can include PCC rules corresponding respectively to respective services with the value of UpdFlag being 1, and their respective new validation time and invalidation time.

The PGW stores respective items of information of the respective PCC rules in the RAR message, and returns an RAA message to the PCRF entity, upon reception of the RAR message.

The PCRF entity judges whether the RAA message fed back by the PGW has been received in a preset period of time, and if so, then the PCRF entity continues with updating periodically the validation time and the invalidation time of the respective PCC rules in the RAR message; otherwise, the PCRF entity clears the locally stored respective items of information of the respective PCC rules in the RAR message.

Figure 7:
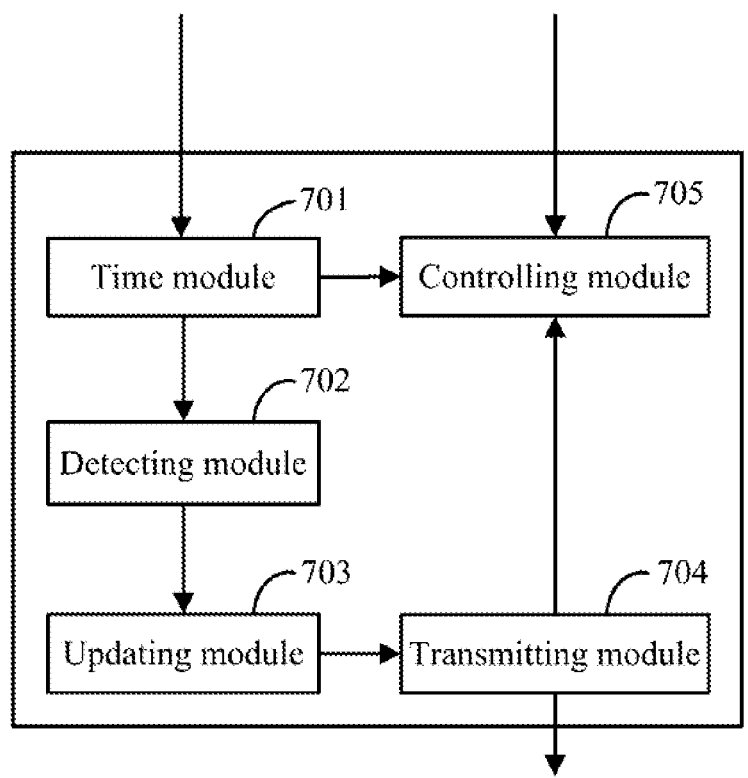
FIG. 7 illustrates a schematic diagram of a device for controlling a PCC rule in a preload mode according to an embodiment of the invention.

Based upon the embodiment of the method above, an embodiment of the invention further provides a device for controlling a PCC rule in a preload mode, and FIG. 7 illustrates a schematic diagram of the device including:

A time module 701 is configured to record system time each time a PCC rule is issued, and to obtain an update time interval of the preload mode, in the preload mode;

A detecting module 702 is configured to detect a time interval between current time and the recorded system time when a PCC rule corresponding to a service currently in a steady session state is lastly issued, upon detecting no enforcement date preset for the service; and An updating module 703 is configured to update validation time and invalidation time of the PCC rule corresponding to the detected service, for which no enforcement date is preset, when the time interval between the current time and the system time when the PCC rule is lastly issued is the obtained update time interval of the preload mode.

The device above further comprises: a transmitting module 704 configured to transmit the generated new validation time and new invalidation time of the PCC rule corresponding to the detected service, for which no enforcement date is preset, together with the corresponding PCC rule to a PGW in an RAR message, after the updating module 703 updates the validation time and the invalidation time of the PCC rule corresponding to the detected service for which no enforcement date is preset; and A controlling module 705 is configured to detect whether a corresponding RAA message is received in a preset period of time after the transmitting module 704 transmits the generated new validation time and new invalidation time of the PCC rule corresponding to the detected service, for which no enforcement date is preset, together with the corresponding PCC rule to the PGW in the RAR message; and if an RAA message is received, to continue with updating periodically the validation time and the invalidation time of the corresponding PCC rule; otherwise, to clear stored information about the corresponding PCC rule.

An embodiment of the invention further provides a Policy and Charging Rule Function (PCRF) entity device including a processor and a data transceiving interface, where:

The processor is configured to record system time each time a PCC rule is issued to a PGW, and to obtain an update time interval of the preload mode, in the preload mode; to detect a time interval between current time and the recorded system time when a PCC rule corresponding to a service currently in a steady session state is lastly issued, upon detecting no enforcement date preset for the service; and to update validation time and invalidation time of the PCC rule corresponding to the detected service, for which no enforcement date is preset, when the time interval between the current time and the recorded system time when the PCC rule is lastly issued is the obtained update time interval of the preload mode; and The data transceiving interface is configured to communicate data between the processor and the PGW.

Preferably the processor is configured to generate the new validation time and new invalidation time of the PCC rule corresponding to the detected service, for which no enforcement date is preset, according to a preset enforcement time interval of the detected service for which no enforcement date is preset, and the last validation time and last invalidation time of the PCC rule corresponding to the detected service for which no enforcement date is preset.

Preferably the processor is further configured to continue with detecting whether an enforcement date is preset for a next service in a steady session state with a corresponding PCC rule, if the time interval between the current time and the system time when the PCC rule is lastly issued does not reach the update time interval of the preload mode.

Preferably the processor is configured to record a Greenwich Mean Time (GMT) each time a PCC rule is issued and to take the length of time between each time and a next time when the same PCC rule as the update time interval of the preload mode.

Preferably the processor is further configured to transmit the generated new validation time and new invalidation time of the PCC rule corresponding to the detected service, for which no enforcement date is preset, together with the corresponding PCC rule to a network element of a core network, which is Packet Gateway (PGW) in an Re-Auth Request (RAR) message, after the updating module updates the validation time and the invalidation time of the PCC rule corresponding to the detected service for which no enforcement date is preset; and Preferably the processor is further configured to detect whether a corresponding Re-Auth Response (RAA) message is received in a preset period of time after the transmitting module transmits the generated new validation time and new invalidation time of the PCC rule corresponding to the detected service, for which no enforcement date is preset, together with the corresponding PCC rule to the PGW in the Re-Auth Request (RAR) message; and if an RAA message is detected, to continue with updating periodically the validation time and the invalidation time of the corresponding PCC rule; otherwise, to clear stored information about the corresponding PCC rule.

In the embodiments of the invention, the PCRF detects a service for which no enforcement date is preset, and transmits an RAR message including new validation time and invalidation time of a PCC rule corresponding to the service, for which no enforcement date is preset, to the PGW at each update time interval of the preload mode so as to address the problem in the prior art of the impossibility to apply repeatedly a preset enforcement time of a PCC rule, making it impossible to enforce repeatedly the PCC rule, which may result in an increased signaling overhead and increased consumption of system resources and consequentially in degraded values of applying and popularizing the preload mode.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for controlling a Policy Control and Charging (PCC) rule in a preload mode, comprising:
   recording, by a Policy and Charging Rule Function (PCRF) entity, system time each time a PCC rule is issued, and obtaining an update time interval of the preload mode, in the preload mode;
   detecting, by the PCRF entity, a time interval between current time and the recorded system time when a PCC rule corresponding to a service currently in a steady session state is lastly issued, upon detecting no enforcement date preset for the service; and
   updating, by the PCRF entity, validation time and invalidation time of the PCC rule corresponding to the detected service, for which no enforcement date is preset, when the time interval between the current time and the recorded system time when the PCC rule is lastly issued is the obtained update time interval of the preload mode.

2. The method according to claim 1, wherein updating, by the PCRF entity, the validation time and the invalidation time of the PCC rule corresponding to the detected service for which no enforcement date is preset comprises:
   generating, by the PCRF entity, new validation time and new invalidation time of the PCC rule corresponding to the detected service, for which no enforcement date is preset, according to a preset enforcement time interval of the detected service for which no enforcement date is preset, and last validation time and last invalidation time of the PCC rule corresponding to the detected service for which no enforcement date is preset.

3. The method according to claim 2, wherein after the PCRF entity updates the validation time and the invalidation time of the PCC rule corresponding to the detected service for which no enforcement date is preset, the method further comprises:
   transmitting, by the PCRF entity, the generated new validation time and new invalidation time of the PCC rule corresponding to the detected service, for which no enforcement date is preset, together with the corresponding PCC rule to a network element of a core network, which is Packet Gateway (PGW), in an Re-Auth Request (RAR) message.

4. The method according to claim 1, further comprising:
   continuing, by the PCRF entity, with detecting whether an enforcement date is preset for a next service in a steady session state with a corresponding PCC, if the time interval between the current time and the system time when the PCC rule is lastly issued does not reach the update time interval of the preload mode.

5. The method according to claim 4, wherein after the PCRF entity updates the validation time and the invalidation time of the PCC rule corresponding to the detected service for which no enforcement date is preset, the method further comprises:
   transmitting, by the PCRF entity, the updated validation time and invalidation time of the PCC rule corresponding to the detected service, for which no enforcement date is preset, together with the corresponding PCC rule to a network element of a core network, which is Packet Gateway (PGW), in an Re-Auth Request (RAR) message.

6. The method according to claim 1, wherein the recording, by the PCRF entity, the system time each time the PCC rule is issued comprises:
   recording, by the PCRF entity, a Greenwich Mean Time (GMT) each time the PCC rule is issued and taking a length of time between each time and a next time when the same PCC rule is issued as the update time interval of the preload mode.

7. The method according to claim 6, wherein after the PCRF entity updates the validation time and the invalidation time of the PCC rule corresponding to the detected service for which no enforcement date is preset, the method further comprises:
   transmitting, by the PCRF entity, the updated validation time and invalidation time of the PCC rule corresponding to the detected service, for which no enforcement date is preset, together with the corresponding PCC rule to a network element of a core network, which is Packet Gateway (PGW), in an Re-Auth Request (RAR) message.

8. The method according to claim 1, wherein after the PCRF entity updates the validation time and the invalidation time of the PCC rule corresponding to the detected service for which no enforcement date is preset, the method further comprises:
   transmitting, by the PCRF entity, the updated validation time and invalidation time of the PCC rule corresponding to the detected service, for which no enforcement date is preset, together with the corresponding PCC rule to a network element of a core network, which is Packet Gateway (PGW), in an Re-Auth Request (RAR) message.

9. The method according to claim 8, wherein after the PCRF entity transmits the generated new validation time and new invalidation time of the PCC rule corresponding to the detected service, for which no enforcement date is preset, together with the corresponding PCC rule to the PGW in the RAR message, the method further comprises:
   detecting, by the PCRF entity, whether a corresponding Re-Auth Answer (RAA) message is received in a preset period of time; and
   if an RAA message is received, then continuing with updating periodically the validation time and the invalidation time of the corresponding PCC rule; otherwise, clearing stored information about the corresponding PCC rule.

10. A device for controlling a Policy Control and Charging (PCC) rule in a preload mode, comprising a processor and a transmitter, wherein:
    the processor records system time each time a PCC rule is issued, and obtains an update time interval of the preload mode, in the preload mode;
    the processor detects a time interval between current time and the recorded system time when a PCC rule corresponding to a service currently in a steady session state is lastly issued, upon detecting no enforcement date preset for the service; and
    the processor updates validation time and invalidation time of the PCC rule corresponding to the detected service, for which no enforcement date is preset, when the time interval between the current time and the system time when the PCC rule is lastly issued is the obtained update time interval of the preload mode.

11. The device according to claim 10, wherein the processor is configured:
    to generate new validation time and new invalidation time of the PCC rule corresponding to the detected service, for which no enforcement date is preset, according to a preset enforcement time interval of the detected service for which no enforcement date is preset, and last validation time and last invalidation time of the PCC rule corresponding to the detected service for which no enforcement date is preset.

12. The device according to claim 11, wherein the transmitter is configured:

to transmit the generated new validation time and new invalidation time of the PCC rule corresponding to the detected service, for which no enforcement date is preset, together with the corresponding PCC rule to a network element of a core network, which is a Packet Gateway (PGW), in a Re-Auth Request (RAR) message, after the updating module updates the validation time and the invalidation time of the PCC rule corresponding to the detected service for which no enforcement date is preset.

13. The device according to claim 10, wherein the processor is further configured:

to continue with detecting whether an enforcement date is preset for a next service in a steady session state with a corresponding PCC rule, if the time interval between the current time and the system time when the PCC rule is lastly issued does not reach the update time interval of the preload mode.

14. The device according to claim 13, wherein the transmitter is configured:

to transmit the updated validation time and invalidation time of the PCC rule corresponding to the detected service, for which no enforcement date is preset, together with the corresponding PCC rule to a network element of a core network, which is a Packet Gateway (PGW), in a Re-Auth Request (RAR) message, after the updating module updates the validation time and the invalidation time of the PCC rule corresponding to the detected service for which no enforcement date is preset.

15. The device according to claim 10, wherein the processor is configured:

to record a Greenwich Mean Time (GMT) each time the PCC rule is issued and to take a length of time between each time and a next time when the same PCC rule is issued as the update time interval of the preload mode.

16. The device according to claim 15, wherein the transmitter is configured:

to transmit the updated validation time and invalidation time of the PCC rule corresponding to the detected service, for which no enforcement date is preset, together with the corresponding PCC rule to a network element of a core network, which is a Packet Gateway (PGW), in a Re-Auth Request (RAR) message, after the updating module updates the validation time and the invalidation time of the PCC rule corresponding to the detected service for which no enforcement date is preset.

17. The device according to claim 10, wherein the transmitter is configured:

to transmit the updated validation time and new invalidation time of the PCC rule corresponding to the detected service, for which no enforcement date is preset, together with the corresponding PCC rule to a network element of a core network, which is a Packet Gateway (PGW), in a Re-Auth Request (RAR) message, after the updating module updates the validation time and the invalidation time of the PCC rule corresponding to the detected service for which no enforcement date is preset.

18. The device according to claim 17, the processor is further configured:

to detect whether a corresponding Re-Auth Answer (RAA) message is received in a preset period of time after the transmitting module transmits the generated new validation time and new invalidation time of the PCC rule corresponding to the detected service, for which no enforcement date is preset, together with the corresponding PCC rule to the PGW in the Re-Auth Request (RAR) message; and if an RAA message is received, to continue with updating periodically the validation time and the invalidation time of the corresponding PCC rule; otherwise, to clear stored information about the corresponding PCC rule.

* * * * *